US006460752B1

(12) United States Patent
Waldron et al.

(10) Patent No.: US 6,460,752 B1
(45) Date of Patent: Oct. 8, 2002

(54) METHOD OF FRICTION STIR WELDING WITH GROOVED BACKING MEMBER

(75) Inventors: Douglas J. Waldron, Fountain Valley, CA (US); Robert Scott Forrest, Santa Ana, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/542,207

(22) Filed: Apr. 4, 2000

(51) Int. Cl.[7] .................................................. B23K 20/12
(52) U.S. Cl. ...................................... 228/112.1; 228/2.1
(58) Field of Search ................................ 228/2.1, 112.1

(56) References Cited

U.S. PATENT DOCUMENTS

| | | |
|---|---|---|
| 3,418,196 A | 12/1968 | Luc |
| 3,949,896 A | 4/1976 | Luc |
| 4,106,167 A | 8/1978 | Luc |
| 5,460,317 A | 10/1995 | Thomas et al. |
| 5,611,479 A | 3/1997 | Rosen |
| 5,769,306 A * | 6/1998 | Colligan |
| 5,971,247 A * | 10/1999 | Gentry |
| 5,975,406 A * | 11/1999 | Mahoney et al. |
| 6,199,745 B1 * | 3/2001 | Campbell et al. |
| 6,213,379 B1 * | 4/2001 | Takeshita et al. |

FOREIGN PATENT DOCUMENTS

| | | | |
|---|---|---|---|
| EP | 000810054 A1 | * | 12/1997 |
| EP | 0 810 054 A1 | | 12/1997 |
| GB | 2270864 A | | 3/1994 |
| JP | 410052769 A | * | 2/1998 |
| JP | 10225780 | | 3/1998 |

OTHER PUBLICATIONS

Translation of JP–10225780.*

* cited by examiner

*Primary Examiner*—Tom Dunn
*Assistant Examiner*—Kiley Stoner
(74) *Attorney, Agent, or Firm*—Alston & Bird LLP

(57) ABSTRACT

A backing member for a friction stir butt welding apparatus includes a groove in the working surface of the backing member which supports the workpieces being butt welded. The backing member is positioned with the groove aligned directly beneath the butt joint between the workpieces. A rotating friction stir welding pin is introduced at the joint so as to plasticize the material of the workpieces on either side of the joint, and pressure is applied between the stir pin and the workpieces to create a forging pressure which forces plasticized material downward through the root zone of the weld and into the groove in the backing member. A visible bead is thus produced on the lower surfaces of the workpieces indicating total penetration of the weld. Lack of a bead indicates probable failure of the weld to totally penetrate through the root zone.

4 Claims, 2 Drawing Sheets

METHOD OF FRICTION STIR WELDING WITH GROOVED BACKING MEMBER

FIELD OF THE INVENTION

The present invention relates to a friction stir welding apparatus and method and, more particularly, to a backing member and a method of using same in a friction stir welding process which facilitate total penetration of a butt weld as well as creation of a visual indication of the completeness of the weld.

BACKGROUND OF THE INVENTION

Friction stir welding is a known technique for welding and has found particular utility for butt welding two workpieces together along a joint line therebetween defined by abutting edges of the workpieces. The friction stir welding process generally involves engaging the material of the two workpieces on either side of the joint by a cyclically moving stir pin or blade. Friction between the stir pin or blade and the workpieces causes frictional heating and plasticizing of the material adjacent the joint. The stir pin or blade is traversed along the line of the joint, plasticizing the material as it moves, and the plasticized material left behind the stir pin or blade coalesces and resolidifies to form a weld between the workpieces.

The friction stir welding process has demonstrated unique joining capabilities of aluminum alloys. In a conventional method, a rotating stir pin is plunged into the material of the workpieces on either side of the weld, with the distal end or tip of the stir pin extending close to but not all the way through to the bottom surfaces of the workpieces. The "root" zone between the tip of the stir pin and the bottom surfaces of the workpieces theoretically is welded by plasticized material being-forced downward through the joint to the bottom surfaces of the workpieces. However, when a butt weld is formed by the process, the "root" side of the weld is difficult to inspect. In particular, penetration of the weld completely through the joint to the root side has been difficult to determine with conventional inspection techniques such as radiographic and ultrasonic inspection. It is possible for the abutting edges of the workpieces in the root region to abut one another so tightly that even though they are not welded, conventional inspection fails to detect the faulty weld.

Attempts have been made to modify the friction stir welding technique to better assure a complete weld penetration through the root zone. For example, U.S. Pat. No. 5,611,479 issued to Rosen discloses a method for friction stir butt welding in which the faying edges of the two workpieces are chamfered away from each other adjacent the bottom surfaces to create an inverted V-shaped space adjacent the back-up bar which contacts the bottom surfaces of the workpieces. The plasticized material from the friction stir weld can enter the volume created by the chamfer at the bottom of the faying surfaces. Visual inspection for complete weld penetration is then possible since a completely penetrated weld will be evidenced by solidified material present in the chamfered space.

The disadvantage of Rosen's method is that it necessitates additional work steps to create the chamfered edges of the workpieces. Furthermore, if the weld penetration is not complete, then there will be voids in the chamfered volume which will have to be filled in by additional welding and blending along the root side. Accordingly, the method is not as economical as conventional friction stir butt welding methods.

SUMMARY OF THE INVENTION

The present invention overcomes the drawbacks associated with known friction stir welding apparatus and techniques by providing an apparatus and a method for friction stir welding which create a visible bead on the root side when the weld is fully penetrated. Thus, presence of the bead indicates full penetration, and lack of the bead at any point along the welded joint line indicates probable failure of the weld to fully penetrate at that point.

To these ends, the invention provides a friction stir welding apparatus including a back-up bar having a working surface (i.e., the surface which contacts the workpieces) which generally conforms to the contours of the workpieces on either side of the joint, except that the working surface has a groove formed therein. The back-up bar is positioned under the workpieces with the working surface contacting the bottom surfaces of the workpieces and with the groove located directly beneath the joint and the longitudinal axis of the groove parallel to the line of the joint. Thus, when the stir pin is plunged into the material of the workpieces at the joint and pressure is applied between the stir pin and the workpieces, the pressure causes the material which is plasticized by the stir pin to be forced downward through the root zone of the joint and into the groove in the back-up bar where the material solidifies to form a bead which stands out from the bottom surfaces of the workpieces.

The width, depth, and shape of the groove can be varied to suit the particular application. For instance, the volume of the groove, which is primarily a function of its width and depth, generally is dictated by the thickness of the workpieces at the joint, and is made as small as possible to minimize reduction in joint thickness.

BRIEF DESCRIPTION OF THE DRAWINGS

Additional objects, features, and advantages of the invention will become apparent from the following description of a specific embodiment thereof taken in conjunction with the accompanying drawings in which.

DETAILED DESCRIPTION OF THE DRAWINGS

Figure 1:
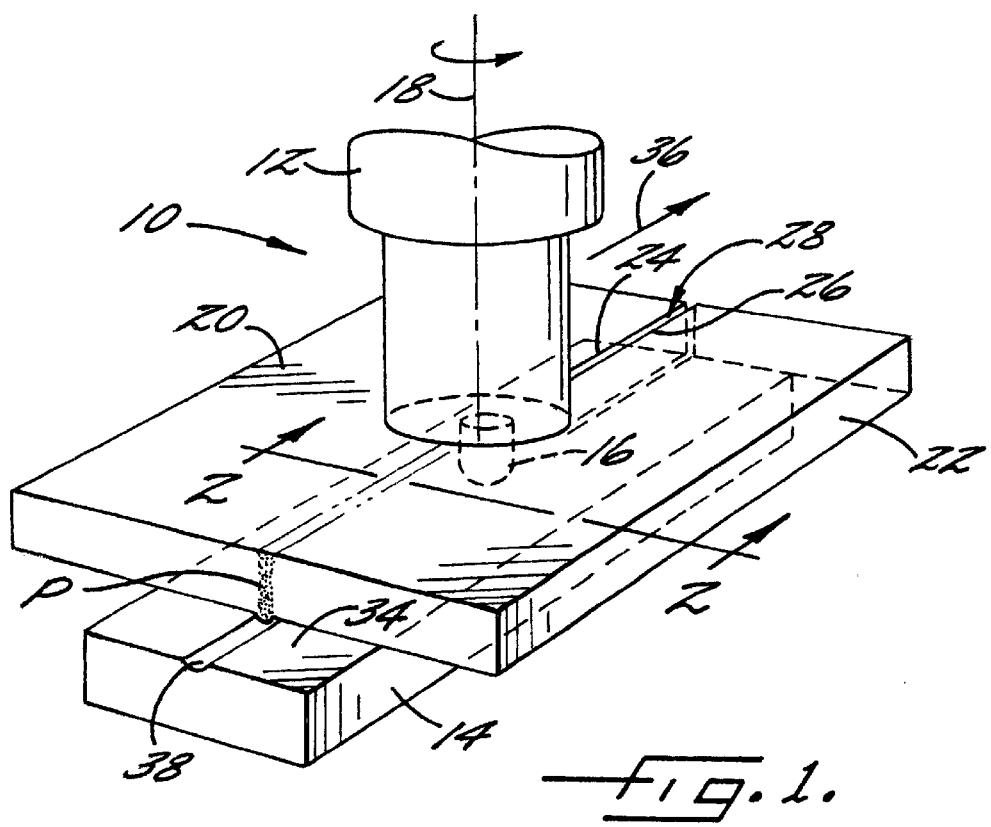
FIG. 1 is a perspective view of a friction stir welding apparatus in accordance with the principles of the present invention engaging a pair of workpieces to join them together in a butt weld.
Figure 2:
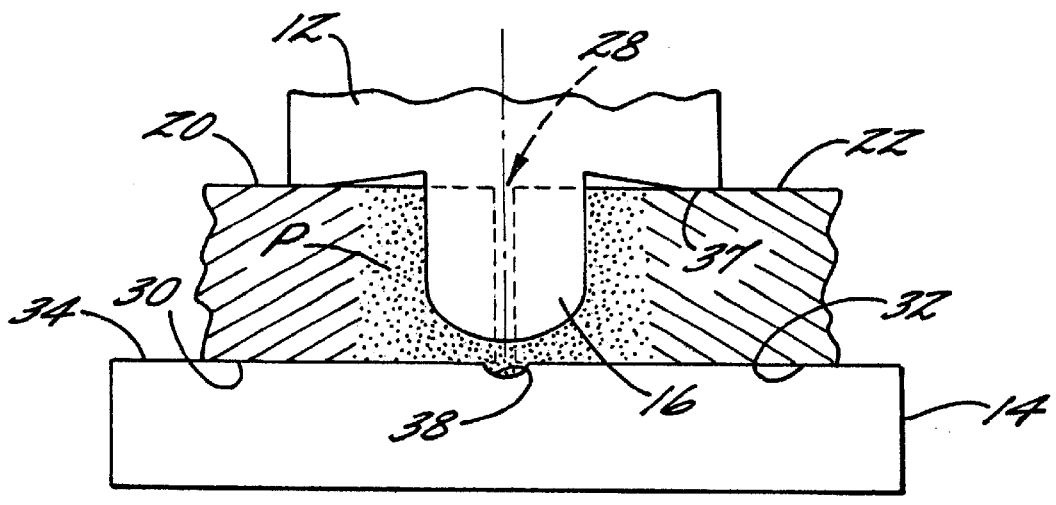
FIG. 2 is a cross-sectional view taken along line 2—2 of FIG. 1, showing plasticized material filling the space of the groove in the back-up bar of the apparatus.

With reference to FIGS. 1 and 2, a friction stir welding apparatus is broadly indicated at 10. The apparatus 10 is generally of the type described in U.S. Pat. No. 5,460,317, the entire disclosure of which is incorporated herein by reference. The apparatus 10 includes a stir pin tool 12 and a back-up bar 14. The stir pin tool 12 has a stir pin 16 attached at its distal end. The stir pin tool 12 is rotatable about its longitudinal axis 18, and during a welding operation is rotatably driven by a suitable drive motor (not shown). The stir pin tool 12 is also translatable for traversing a joint line to be welded, as further described below. The stir pin tool 12 and back-up bar 14 are constructed of a material having a higher melting point temperature and greater hardness than the material of the workpieces 20, 22. For instance, for welding aluminum alloys, the stir pin 12 is preferably made of tool steel, and the back-up bar 14 preferably is made of tool steel, mild steels, or stainless steels.

In FIG. 1, the apparatus 10 is shown performing a butt weld for welding together two workpieces 20 and 22.

The workpieces 20 and.22 have edges 24 and 26, respectively, which abut each other to define a joint 28 therebetween. The workpieces 20 and 22 are held in abutting relationship during the welding operation by suitable restraining means (not shown). The back-up bar 14 is located beneath the workpieces so that the area of the joint 28 between the workpieces is sandwiched between the stir pin tool 12 and the back-up bar 14 and the lower surfaces 30 and 32 of the workpieces 20 and 22, respectively, are supported on the upper working surface 34 of the back-up bar 14. With the workpieces in abutting relationship and the stir pin tool 12 disposed above the joint 28, the stir pin tool 12 is rotatably driven about its axis 18 and is then driven in a translational movement by suitable biasing means (not shown) toward the joint 28 generally along the direction of the axis 18. The stir pin 16 engages the workpieces 20, 22, contacting the material on either side of the joint 28, and the biasing means applies pressure between the stir pin tool 12 and the workpieces 20, 22. Accordingly, friction between the rotating stir pin 16 and the workpieces 20, 22 causes heating and consequent plasticizing of the material surrounding the stir pin 16. The stir pin 16 is plunged into the plasticized region of the workpieces until the distal tip of the stir pin 16 is a small distance, such as about 0.10 to 0.33 mm for ¼ inch thick aluminum plate, above the lower surfaces 30, 32. The stir pin tool 12 is then translated along the line of the joint 28, as indicated by arrow 36, and the rotating stir pin 16 plasticizes the material on either side of the joint 28 as the tool moves therealong. Thus, surrounding the stir pin 16 as well as in the wake of the advancing stir pin 16 is left a plasticized zone P which coalesces and solidifies to produce a weld. Any suitable means for advancing the tool 12 along the joint 28 may be employed, including motors and gearing, hydraulic actuators, or other means. The stir pin tool 12 includes a shoulder 37 which contacts the upper surfaces of the workpieces adjacent the joint for preventing plasticized material from being forced out the top of the joint 28.

The back-up bar 14 includes a groove 38 in its upper surface 34. The groove 38 extends along the length of the back-up bar 14 in the direction defined by the line of the joint 28. The back-up bar 14 is positioned such that the groove 38 is directly beneath the joint 28, as shown in FIG. 2. As the stir pin 16 is rotated and advanced along the joint 28, the forging pressure exerted on the plasticized material by the pressure applied between the stir pin 16 and workpieces 20, 22 causes plasticized material to be forced downward through the root zone of the joint 28 and into the groove 38.

Figure 3:
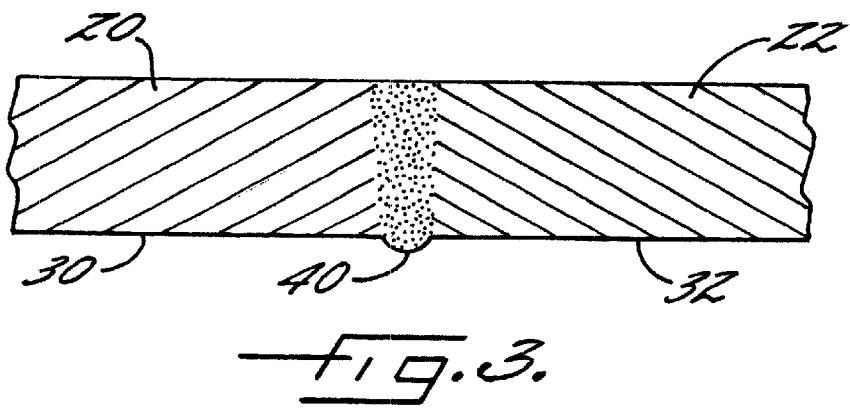
FIG. 3 is a schematic cross-sectional view through a butt weld created by the apparatus and method of the invention, showing a fully penetrated weld as evidenced by a bead on the root side of the weld.
Figure 4:
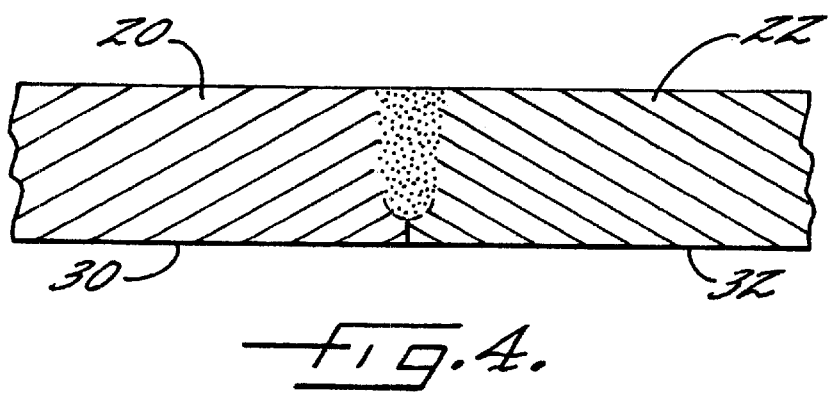
FIG. 4 is a view similar to FIG. 3 schematically illustrating a weld which is not fully penetrated as evidenced by lack of a bead on the root side.

Thus, as shown in FIG. 3, when the weld completely penetrates the joint, a visible bead 40 is created on the lower surfaces 30, 32. However, as shown in FIG. 4, when the weld penetration is not complete, no bead is created. The apparatus and method of the invention thus facilitate inspection of friction stir welded butt welds, since lack of a bead indicates probable failure of the weld to totally penetrate the joint.

The bead 40 may be removed by grinding or other process after completion of the butt weld.

Pressure is applied between the stir pin tool 12 and the workpieces 20, 22 by any suitable means including hydraulic actuators or gearing such as a rack-and-pinion arrangement actuated by a motor. A forging pressure of about 5000 to about 10,000 pounds is exerted between the tool 12 and the workpieces. The stir pin tool 12 is rotated at an angular rate of about 150 to about 1200 rpm depending on the alloy and the thickness of the material being welded. Preferably, the tool 12 is slightly angled, for example by about 3°, in the direction of translation along the joint 28 such that the tip of the pin 16 slightly leads the rest of the tool 12. The tool 12 is advanced along the joint 28 at a linear speed of about 5 inches per minute (2 mm per second).

The apparatus and method of the invention are useful for welding a variety of materials including aluminum alloys, titanium, copper, metal matrix, and others.

Figure 5:
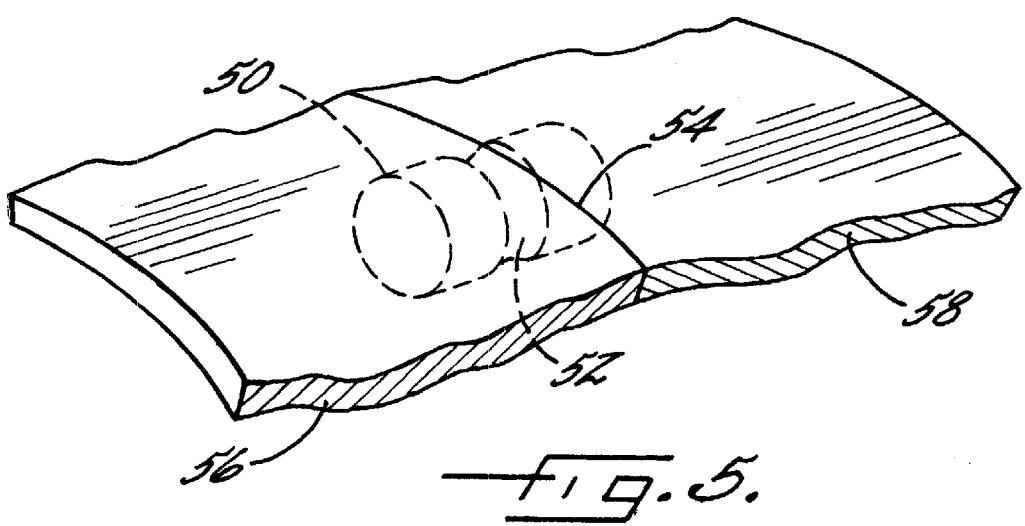
FIG. 5 is a perspective view illustrating a back-up roller having a circumferential groove in its outer surface and showing the roller positioned in a working position aligned with a joint between two generally cylindrical parts.

Variations on the embodiment shown in FIGS. 1–2 are possible. For example, the back-up bar 14 shown in FIGS. 1–2 is a stationary member, but it could alternatively be a movable member such as a wheel that rolls along the lower surfaces of the workpieces. This arrangement would have particular utility for making butt welds between two generally cylindrical or otherwise curved parts. FIG. 5 depicts such an embodiment of a back-up roller 50 having a circumferential groove 52 formed in its outer surface. The roller 50 is positioned with the groove 52 aligned with the joint 54 between two curved workpieces 56 and 58. The rotating stir pin (not shown in FIG. 5) is brought from the opposite side of the joint 54 into engagement with the joint 54 and is advanced along the length of the joint, as previously described. The roller 50 is rolled along the lower surfaces of the workpieces in synchronism with the movement of the stir pin so that the groove 52 remains aligned with the joint 54 and with the stir pin.

Although the stir pin tool 12 is illustrated in FIGS. 1 and 2 as being a rotating member, other types of cyclically moving tools may be used for frictionally engaging the workpieces to cause frictional heating and plasticizing thereof. For instance, a reciprocating blade or an eccentrically rotating tool may be used. The important considerations are that the cyclically moving tool create sufficient friction to heat and plasticize the material being joined, and that there is some means, which may be the tool itself or other pressure-applying means, for creating enough forging pressure on the plasticized material to force it downward through the root zone of the joint into the groove in the back-up bar.

While the invention has been illustrated and described by reference to specific embodiments thereof, and while these embodiments have been described in considerable detail, the invention is not limited to the apparatus and methods described. Modifications to the embodiments described herein falling within the scope of the invention will occur to those of ordinary skill in the art. Accordingly, the scope of the invention is to be determined by reference to the appended claims.

What is claimed is:

1. A method of friction stir butt welding two workpieces together along a joint therebetween defined by abutting edges of the workpieces, comprising:

plunging a rotating stir pin of a friction stir welding tool from a first side of the workpieces into the material of the workpieces at the joint to cause frictional heating and plasticizing of the material around and under the stir pin on both sides of the joint, a tip of the stir pin being displaced above a second side of the workpieces so as to define a root zone between the tip and the second side, a shoulder of the friction stir welding tool engaging the first side of the workpieces to prevent plasticized material from escaping the joint at the first side;

supporting the workpieces on a working surface of a back-up member which contacts a second side of the workpieces at the joint, the back-up member including a groove in the working surface thereof, the groove being configured to form a bead on the second side of the workpieces when filled with material of the workpieces;

positioning the back-up member with at least a portion of the groove aligned with the root zone of the joint; and applying pressure between the stir pin and the workpieces to force plasticized material through the root zone of the joint and into so as to fill the groove in the back-up member and thereby form a bead on the second side of the workpieces.

2. The method of claim 1, further comprising the step of removing the bead from the workpieces after completion of the butt weld.

3. The method of claim 1, further comprising the step of advancing the rotating stir pin along the, joint while engaged therein so as to produce a weld along the length of the joint.

4. The method of claim 3 wherein the step of supporting the workpieces comprises supporting the workpieces on a back-up member in the form of a roller having a circular outer surface, the groove being formed in the outer surface and extending circumferentially therearound, and further comprising the step of rolling the roller along the second side of the workpieces as the rotating, stir pin is advanced along the joint so as to keep a portion of the groove aligned with the root zone of the joint.

\* \* \* \* \*